United States Patent [19]

Hideshima et al.

[11] 3,971,986

[45] July 27, 1976

[54] REMOTE CONTROL SYSTEM FOR RADIO RECEIVER

[75] Inventors: Yasuhiro Hideshima; Masakatsu Toyoshima, both of Tokyo, Japan

[73] Assignee: Sony Corporation, Tokyo, Japan

[22] Filed: Aug. 21, 1974

[21] Appl. No.: 499,211

[30] Foreign Application Priority Data

Aug. 23, 1973 Japan.............................. 48-94714

[52] U.S. Cl.................................... 325/37; 325/47; 325/61; 325/391; 343/228
[51] Int. Cl.².......................................... H04B 1/00
[58] Field of Search ............... 325/30, 163, 36, 37, 325/47, 59–61, 155, 175, 183, 390–393, 397, 404; 179/1 G, 1 VL, 15 BM; 340/147 R, 147 C, 167 R, 171 A; 343/225–228; 178/DIG. 15, 66 R, 88, 66 A

[56] References Cited
UNITED STATES PATENTS

| | | | |
|---|---|---|---|
| 2,378,298 | 6/1945 | Hilferty................................ | 325/30 |
| 3,323,061 | 5/1967 | Davis................................... | 325/163 |
| 3,522,536 | 8/1970 | Reynolds ............................. | 325/37 |
| 3,732,375 | 5/1973 | Kuribayashi.......................... | 325/36 |
| 3,823,385 | 7/1974 | Kitamura ............................. | 325/30 |
| 3,835,454 | 9/1974 | Palmieri et al........................ | 325/30 |

*Primary Examiner*—Robert L. Griffin
*Assistant Examiner*—Jin F. Ng
*Attorney, Agent, or Firm*—Hill, Gross, Simpson, Van Santen, Steadman, Chiara & Simpson

[57] ABSTRACT

An information transmitting system including a transmitter and at least one receiver. The transmitter includes a modulator which is modulated by a first control signal intermittently, and whose center frequency is changed continuously in response to a second control signal. The receiver is provided with a frequency discriminator which demodulates the first and second control signals and the first control signal is applied as a first remotely controllable signal in digital fashion and the second control signal is applied as a second remotely controllable signal in analog fashion in the receiver.

5 Claims, 2 Drawing Figures

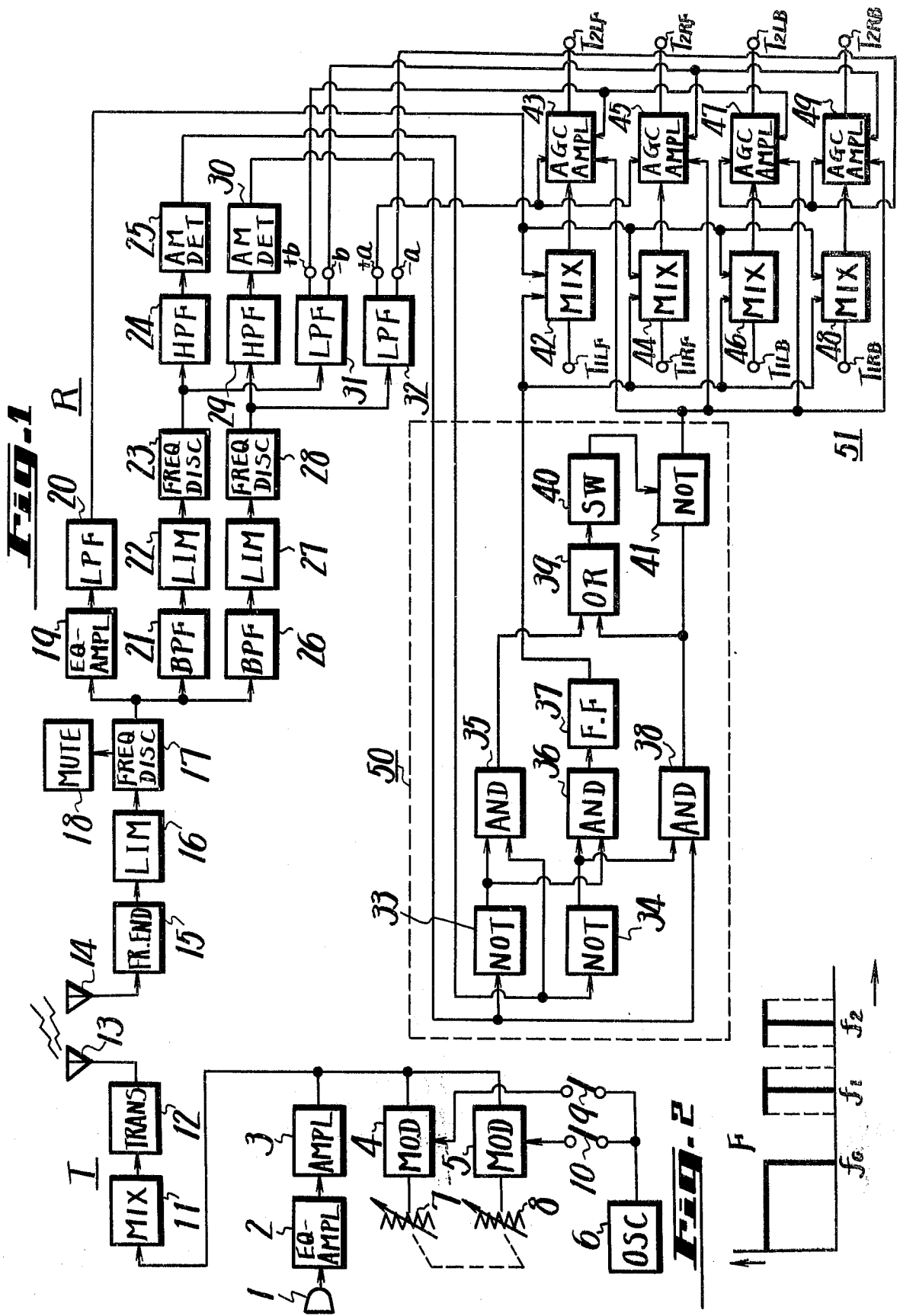

REMOTE CONTROL SYSTEM FOR RADIO RECEIVER

BACKGROUND OF THE INVENTION

1. Field of the Invention

The present invention relates to an information signal transmitting system and, more particularly, to an information signal transmitting system which is intended for use in a remote control apparatus which is controlled intermittently and/or continuously.

2. Description of the Prior Art

The prior art includes remote control apparatus which uses an ultrasonic wave for volume control, channel selection and the like for a television receiver. In the normal remote control apparatus, however, the volume control is effected very often in a step-like manner but occasionally in an analog manner. In an apparatus where sound volume balance between channels is required, such as in the field of a four channel stereophonic system or the like, it is desirable that the remote control signal be varied in an analog manner and that its range of control be large. Further, a multi-functional control signal is required for the ON-OFF control of a signal from a microphone, the master volume control, the channel balance control and the like.

SUMMARY OF THE INVENTION

The present invention provides a novel information transmitting system which is free from the defects of the prior art noted above. It provides an information transmitting system in which, at the transmitter side, a control signal is transmitted after being modulated as a composite signal of a digitally varying signal and an analog varying signal, and the receiver is provided with demodulating means to separate the digital signal and the analog signal which are then separately usable as remote control signals. The carrier frequency of the transmitting system may be in the ultrasonic wave band. The modulated signal to be transmitted may include an audio frequency band signal, a first signal component modulated on a sub-carrier having a carrier frequency which is higher than the upper limit frequency of the audio frequency band signal, and a second signal component modulated so as to shift the center frequency of the sub-carrier, the first signal component being a digital signal with the second signal component being an analog signal.

In the preferred form of the present invention, there is provided an information transmitting system which, at its transmitter side, produces a modulated signal which includes an audio frequency band signal, a first digital signal modulated on a first sub-carrier having a carrier frequency which is higher than the upper limit frequency of the above-noted signal, a first analog signal which is modulated so as to shift the center frequency of the first sub-carrier, a second digital signal modulated on a second sub-carrier having a carrier frequency which is higher than the upper limit frequency of the first digital signal, and a second analog signal which is modulated so as to shift the center frequency of the second sub-carrier. At its receiver side, the above-mentioned first and second digital signals and the first and second analog signals are demodulated to form control signals.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a schematic block diagram showing one embodiment of the present invention; and FIG. 2 is a graph illustrating a frequency spectrum of a modulated signal used in one embodiment of the present invention.

DESCRIPTION OF THE PREFERRED EMBODIMENTS

The following description will be given of an embodiment of an information transmitting system according to this invention, with reference to the drawing.

FIG. 1 illustrates one example of an information transmitting system of the type with which this invention is concerned. The system consists of a transmitter side T and a receiver side R and a four channel stereophonic reproducing apparatus 51 which is the controlled device. The controlling functions are represented by an UP and DOWN control of a volume or master volume control, the input ON and OFF control of a microphone output, and the adjustment of channel balance.

The transmitter side T will be described first. It includes a system consisting of a microphone 1, and equalizing amplifier 2, an amplifier 3, a first modulator 4, a second modulator 5, and an oscillator 6 for supplying a modulation signal of predetermined frequency to the first and second modulators 4 and 5. The transmitter side T is further provided with switches 9 and 10 for controlling the supply of the output from the oscillator 6 to the first and second modulators 4 and 5, together with variable resistors 7 and 8 for varying the oscillation frequencies (center frequencies) of the first and second modulators 4 and 5 in an analog manner, a mixer 11 for mixing the output of the amplifier 3 and the outputs of the first and second modulators 4 and 5, the transmitter 12 being supplied with the output of the mixer 11 and delivering its output to a transmitting antenna 13.

The output of the amplifier 3 is an audio signal having a frequency of less than 15 KHz which is supplied to the input side of the mixer 11. The first modulator 4 is composed, for example, of an astable multivibrator or the like having a carrier frequency $f_1$ which can be varied in the range of 35 ± 2.8 KHz by the adjustment of the variable resistor 7. The carrier frequency $f_1$ is used as a remote control signal for continuously changing the channel volume balance of the left sound signals (left-front and left-back sound signals) and the right sound signals (right-front and right-back sound signals) in the four channel stereophonic reproducing apparatus 51.

The second modulator 5 may also consist of an astable multivibrator having a carrier frequency (center frequency) $f_2$ which is varied in the range of about 50 ± 4 KHz by the adjustment of the variable resistor 8. This carrier frequency can be utilized as a remote control signal for continuously changing the level difference between the front sound signals (left-front and right-front sound signals) and the back sound signals (left-back and right-back sound signals) in the four channel stereophonic reproducing apparatus 51. The variable resistors 7 and 8 are adjusted in common or independently of each other, and the carrier frequencies of the first and second modulators 4 and 5 are thus changed in an analog fashion in accordance therewith.

The oscillator 6 may consist of a Wien bridge type oscillator having an oscillation frequency $f_3$ at a constant 500 Hz. When the switches 9 and 10 are closed, an output signal frequency $f_3$ from the oscillator 6 is supplied to the first and second modulators 4 and 5 to amplitude modulate or frequency modulate these carrier signals. In the particular embodiment described, frequency modulation is employed. Thus, the UP and DOWN of the volume or the master volume of the reproducing apparatus 51 and the input ON and OFF of the output for the microphone 1 are adapted to be controlled by the output signal of the oscillator 6 according to the existence (1) or the absence (0) of the modulation of the first and second modulators 4 and 5 as shown in the following table:

| $f_1$ | $f_2$ | |
|---|---|---|
| 1 | 0 | Master Volume Up |
| 0 | 1 | Master Volume Down |
| 1 | 1 | Microphone ON or OFF |

The transmitter 12 has a main carrier frequency F of 44 MHz which is subjected to multiplex frequency modulation by the output signals from the amplifier 3 and the first and second modulators 4 and 5 as shown by the frequency spectrum of FIG. 2.

Turning now to the receiver side R, reference numeral 14 indicates a receiving antenna. The received signal is supplied to a front end 15 which includes a radio frequency amplifier and a mixer and derives from the input signal a frequency converted signal of an intermediate frequency of 10.7 MHz which is then applied through a limiter 16 to a frequency discriminator 17 for demodulation. The output of the frequency discriminator 17 is applied to a muting circuit 18 which generates a muting signal if required, and also to an equalizing amplifier 19, a band-pass filter 21 having a center frequency of 35 KHz, and a band-pass filter 26 with a center frequency of 50 KHz The output of the equalizing amplifier 19 is supplied to a low-pass filter 20, the passing band frequency $f_0$ of which is less than 15 KHz. The output of this low-pass filter 20 corresponds to the output from the microphone 1 of the transmitter side T.

The output of the band-pass filter 21 is supplied through a limiter 22 to a frequency discriminator 23 for demodulation. The output of the frequency discriminator 23 is supplied to a high-pass filter 24 which passes a frequency $f_3$ higher than 500 Hz, and also to a low-pass filter 31 which passes a signal of a frequency lower than 500 Hz.

The output of the high-pass filter 24 is supplied to an amplitude detector 25. When the switch 9 of the transmitter T is an ON state, an output is derived from the detector 25 but no output is derived when the switch is in the OFF state. The low-pass filter 31 produces outputs at its output terminals $+b$ and $-b$ in opposite phase relation. The thus derived outputs are varied in level according to the resistance value of the variable resistor 7.

The output of the band-pass filter 26 is supplied through a limiter 27 to a frequency discriminator 28 for demodulation. The output of this frequency discriminator 28 is supplied to a high-pass filter 29 which passes a signal of a frequency higher than 500 Hz, and also to a low pass filter 32 through which a signal of a frequency lower than 500 Hz is passed.

The output of the high-pass filter 29 is supplied to an amplitude detector 30. When the switch 10 of the transmitter side T is in the ON state, an output is derived from the detector 30 but no output is derived when the switch is in the OFF state. At this time, low-pass filter 32 derives outputs at its output terminals $+a$ and $-a$ with the outputs in opposite phase relation. The thus derived outputs are changed in level according to the resistance value of the variable resistor 8 of the transmitter side T.

In the four channel stereophonic reproducing apparatus 51, references $T_{1LF}$, $T_{1RF}$, $T_{1LB}$ and $T_{1RB}$ denote left-front, right-front, left-back and right-back sound signal input terminals, respectively, and $T_{2LF}$, $T_{2RF}$, $T_{2LB}$ and $T_{2RB}$ the left-front, right-front, left-back and right-back sound signal output terminals, respectively. Between the input and output terminals there is interposed a mixer 42, an automatic gain control amplifier 43, a mixer 44, an automatic gain control amplifier 45, a mixer 46, an automatic gain control amplifier 47, a mixer 48, and an automatic gain control amplifier 49.

Reference numeral 50 has been applied to a logic circuit for producing control signals to control the master volume of the four channel stereophonic reproducing apparatus and the input ON and OFF of the output from the microphone 1 in response to the outputs from the detectors 25 and 30. The logic circuit 50 is composed of NOT circuits 33 and 34, AND circuits 35, 36 and 38, a flip-flop circuit 37, an OR circuit 39, a switching circuit 40 and a NOT circuit 41. The output of the detector 25 is supplied to the NOT circuit 34 and the AND circuit 35, while the output of the detector 30 is supplied to the NOT circuit 33 and the AND circuit 38. The output of the NOT circuit 33 is supplied to the AND circuits 35 and 36, and the output of the NOT circuit 34 is supplied to the AND circuits 36 and 38. The output of the AND circuit 35 is supplied to the OR circuit 39, and the output of the AND circuit 36 is supplied to the flip-flop circuit 37. The output of the AND circuit 38 is supplied to the OR circuit 39 and the NOT circuit 41. The output of the OR circuit 39 is supplied to the switching circuit 40 while the output of the switching circuit 40 is supplied to the NOT circuit 41. The output of the flip-flop circuit 37, that is, the input ON and OFF of the microphone output is supplied in common to the mixers 42, 44, 46 and 48. An output of the NOT circuit 41, that is, the control or pulse signal of the UP and DOWN of the master volume is supplied in common to the automatic gain control amplifiers 43, 45, 47 and 49, respectively.

The output signal from the output terminal $+b$ of the lowpass filter 31 is supplied to the AGC amplifiers 43 and 47, and the output signal from the output terminal $-b$ is supplied to the AGC amplifiers 45 and 49. The output signal from the output terminal $+a$ of the low-pass filter 32 is supplied to the AGC amplifiers 43 and 45, and the output signal from the output terminal $-a$ is supplied to the AGC amplifiers 47 and 49.

The following is a detailed description of the operation of the information transmitting system of FIG. 1. If the variable resistors 7 and 8 of the transmitter side T are varied, the levels of the left-front and left-back voice signals of the stereo reproducing apparatus 51 and those of the right-front and right-back voice signals thereof can be differentially adjusted and hence the channel balance is remotely controlled in response to the aforementioned variations.

In addition, if the switches 9 and 10 of the transmitter side T are turned ON and OFF, the UP and DOWN of the master volume and the input ON and OFF of the microphone output are controlled as described in connection with the above table. When the input of the microphone output is in an ON state, the sound signal from the microphone 1 of the transmitter T is transmitted and received and therefore added to the sound signals of the respective channels at the channel mixers 42, 44, 46 and 48.

With the above-described circuits, the carrier frequency is modulated by first and second control information signals having different frequencies to form a composite control information signal which is transmitted. The received signal separates the first and second control information signals from the transmitted signal to control the apparatus. Accordingly, two control elements of the controlled apparatus can be independently controlled by one transmitted wave signal. In the embodiment described, only one receiver is employed, but it is also possible to provide a plurality of receivers which are simultaneously controlled. As in the case of the above-described embodiment, when the carrier is frequency modulated by a control information signal of a predetermined frequency, and the carrier frequency is also varied in an analog manner in response to another control information signal, a digital control information signal and an analog control information signal can be transmitted by one transmitting signal to remotely control the controlled apparatus in a digital or analog manner.

Furthermore, in the case where two carriers are used, it is possible to remote control two controlling objects of the controlled apparatus in an analog manner and also to control three controlling objects in a digital manner.

In the described example, an electromagnetic wave is used as the transmitting wave, but an ultrasonic wave, a light source, or the like can also be used. In the case of using an ultrasonic wave, the output of the mixer 11 can be directly converted into an ultrasonic wave for transmission in the embodiment shown in FIG. 1.

It should be evident that various modifications can be made to the described embodiments without departing from the scope of the present invention.

We claim as our invention:

1. An information transmitting system comprising a transmitter and at least one receiver, said transmitter including:
   a. means for producing first and second carrier signals each having a predetermined frequency;
   b. first means for modulating said first and second carrier signals with a first remote control signal;
   c. second means for controlling the center frequency of said first carrier signal in such a manner that the center frequency of said carrier is shifted within a predetermined frequency range;
   d. third means for controlling the center frequency of said second carrier signal in such a manner that the center frequency of said carrier is shifted within a predetermined frequency range; and
   e. means for transmitting said first and second modulated carrier signals; and said receiver including:
      a. means for receiving said first and second modulated carrier signals;
      b. means for demodulating said first remote control signal from said first and second modulated carrier signals;
      c. means for detecting the center frequency changes of said first carrier and producing a second remote control signal; and
      d. means for detecting the center frequency changes of said second carrier and producing a third remote control signal, thereby to provide three control signals for controlling said receiver.

2. An information transmitting system according to claim 1 which further includes means for mixing an additional signal within the audible frequency range to said first and second modulated carrier signals.

3. An information transmitting system according to claim 1 wherein said receiver includes a four channel stereophonic amplifier, the master volume of which is controlled by said first remote control signal and the channel balance of which is controlled by said second and third remote control signals.

4. An information transmitting system according to claim 1, wherein said first remote control signal is substantially a digital signal, and each of said first and second means controls the center frequency of the corresponding carrier signal in an analog manner.

5. An information transmitting system according to claim 4, wherein each center frequency of said first and second carrier signals is within the ultrasonic frequency range.

* * * * *